(12) United States Patent
Namkoong et al.

(10) Patent No.: US 7,645,223 B2
(45) Date of Patent: Jan. 12, 2010

(54) HANDHELD CENTRIFUGE

(75) Inventors: Kak Namkoong, Seoul (KR);
Young-sun Lee, Seongnam-si (KR);
Kwang-wook Oh, Hwaseong-si (KR);
Christopher Hansung Ko, Seongnam-si (KR); Jung-Im Han, Seoul (KR)

(73) Assignee: Samsung Electronics Co., Ltd. (KR)

( * ) Notice: Subject to any disclaimer, the term of this patent is extended or adjusted under 35 U.S.C. 154(b) by 730 days.

(21) Appl. No.: 11/333,857

(22) Filed: Jan. 17, 2006

(65) Prior Publication Data

US 2006/0160688 A1 Jul. 20, 2006

(30) Foreign Application Priority Data

Jan. 17, 2005 (KR) ...................... 10-2005-0004226

(51) Int. Cl.
*B04B 5/02* (2006.01)
*B04B 9/00* (2006.01)

(52) U.S. Cl. .......................................... 494/16; 494/84

(58) Field of Classification Search ................... 494/16, 494/31, 33, 43, 84, 85; 446/247–254
See application file for complete search history.

(56) References Cited

U.S. PATENT DOCUMENTS

| 780,315 | A | | 1/1905 | Wetherill | |
|---|---|---|---|---|---|
| 942,952 | A | | 12/1909 | Wrather | |
| 1,535,502 | A | | 4/1925 | Southwell | |
| 1,866,697 | A | * | 7/1932 | Blackburn | .................. 446/251 |
| 2,795,898 | A | * | 6/1957 | French | ........................ 446/242 |
| 2,891,351 | A | | 6/1959 | Madaras et al. | |
| 3,162,979 | A | * | 12/1964 | Garoogian | .................... 446/242 |
| 3,191,344 | A | * | 6/1965 | Yagjian | ....................... 446/242 |
| 3,924,114 | A | * | 12/1975 | Sanchez | ...................... 446/242 |
| 4,867,727 | A | * | 9/1989 | Lanius | ........................ 446/242 |
| 5,041,042 | A | | 8/1991 | Stein | |
| 5,830,352 | A | | 11/1998 | Holm | |
| 6,905,454 | B2 | * | 6/2005 | Gutierrez | ...................... 494/16 |
| 2004/0063561 | A1 | | 4/2004 | Gutierrez | |
| 2006/0160688 | A1 | * | 7/2006 | Namkoong et al. | ........... 494/16 |

FOREIGN PATENT DOCUMENTS

| CN | 2203174 Y | 7/1995 |
|---|---|---|
| CN | 2312055 Y | 3/1999 |
| CN | 2506353 Y | 8/2002 |
| JP | 03270701 | 12/1991 |
| JP | 06320048 | 11/1994 |
| JP | 10510810 | 10/1998 |
| JP | 2001022268 | 1/2001 |

OTHER PUBLICATIONS

First Chinese Office Action; 2006100049969; Feb. 29, 2008.
European Search Report; Application No. EP 05 02 7639; Date: Jul. 14, 2006.

* cited by examiner

*Primary Examiner*—Charles E Cooley
(74) *Attorney, Agent, or Firm*—Cantor Colburn LLP (57) ABSTRACT

A handheld centrifuge includes an inertia body having an axle and a pair of inertia wheels coupled to the axle. The inertia wheels are coupled to the axle in substantially perpendicular direction to the axle, and spaced apart from each other. A string is connected to the axle. At least one closed vessel is detachably installed on an outer face of the inertia wheel to contain a substance to be centrifuged. The closed vessel is installed in substantially radial direction of the inertia wheel.

7 Claims, 7 Drawing Sheets

| | | A | B | C | D | E | F | G | H | I |
|---|---|---|---|---|---|---|---|---|---|---|
| 1 | | 10911 | 11074 | 10404 | 11590 | 10006 | | | 11684 | 10139 |
| 2 | | 10947 | 10646 | 10912 | 11237 | 11199 | | | 11567 | 10426 |
| 3 | | 10916 | 9977 | 10122 | 9427 | 11508 | | | 11923 | 10293 |
| 4 | | 11336 | 9979 | 10231 | 10174 | 10849 | | | 12014 | 9356 |
| 5 | | 10848 | 10406 | 9979 | 9676 | 9949 | | | 12339 | 11161 |
| 6 | | | | | 11164 | | | | 11366 | |
| 7 | | | | | 10104 | | | | 11900 | |
| 8 | 2004.09.13 | | | | 10254 | | | | 9123 | |
| 9 | | | | | 9306 | | | | 11458 | |
| 10 | | | | | 10258 | | | | 12183 | |
| 11 | | | | | | | | | 12003 | |
| 12 | | | | | | | | | 11614 | |
| 13 | | | | | | | | | 10970 | |
| 14 | | | | | | | | | 11311 | |
| 15 | | | | | | | | | 11943 | |
| 16 | | 10791 | | 11205 | | 11278 | | 11268 | 11642 | |
| 17 | | 10892 | | 10930 | | 11076 | | 11575 | 11746 | |
| 18 | 2004.09.15 | 11016 | | 12023 | | 11823 | | 11377 | 11994 | |
| 19 | | 11209 | | 11653 | | 10051 | | 11257 | 12001 | |
| 20 | | 11106 | | 11454 | | 11616 | | 10694 | 12118 | |
| 21 | | 10707 | 11561 | 11189 | | | 10487 | | 11581 | |
| 22 | | 11086 | 11563 | 11164 | | | 10983 | | 11584 | |
| 23 | | 11152 | 11630 | 10659 | | | 10283 | | 11519 | |
| 24 | | 11201 | 11423 | 11072 | | | 10137 | | 11658 | |
| 25 | | 11279 | 11367 | 11432 | | | | | 11559 | |
| 26 | | | 11703 | | | | | | 12060 | |
| 27 | | | 11499 | | | | | | 11448 | |
| 28 | | | 11204 | | | | | | 11747 | |
| 29 | | | 10866 | | | | | | 11882 | |
| 30 | 2004.09.16 | | 11398 | | | | | | 11960 | |
| 31 | | | | | | | | | 11584 | |
| 32 | | | | | | | | | 12079 | |
| 33 | | | | | | | | | 11137 | |
| 34 | | | | | | | | | 11929 | |
| 35 | | | | | | | | | 12165 | |
| 36 | | | | | | | | | 12715 | |
| 37 | | | | | | | | | 12183 | |
| 38 | | | | | | | | | 12297 | |
| 39 | | | | | | | | | 11595 | |
| 40 | | | | | | | | | 12137 | |
| Average | | 11026 | 11086 | 10962 | 10319 | 10936 | 10473 | 11234 | 11743 | 10275 |
| St. Dev. | | 187 | 583 | 588 | 781 | 700 | 369 | 328 | 548 | 646 |
| %CV | | 1.69% | 5.26% | 5.37% | 7.56% | 6.40% | 3.53% | 2.92% | 4.67% | 6.29% |

HANDHELD CENTRIFUGE

CROSS-REFERENCE TO RELATED PATENT APPLICATION

This application claims the benefit of Korean Patent Application No. 10-2005-0004226, filed on Jan. 17, 2005, in the Korean Intellectual Property Office, the disclosure of which is incorporated herein in its entirety by reference.

BACKGROUND OF THE INVENTION

1. Field of the Invention

The present invention relates to a handheld centrifuge, and more particularly, to a handheld centrifuge that is easy to carry.

2. Description of the Related Art

Centrifugation involves the use of centrifugal force for the separation, refinement, or concentration of mixtures having different ingredients or specific gravities. A centrifuge is an apparatus that uses centrifugal force to separate particles from a suspension.

The performance of a centrifuge is determined by the magnitude of the centrifugal force it generates. Relative centrifugal force (RCF=centrifugal acceleration/gravitational acceleration) is used to express the performance of the centrifuge. Since the magnitude ($a_c$) of the centrifugal acceleration is equal to the radius (r) of gyration multiplied by the angular velocity squared ($\omega^2$): $a_c = r\,\omega^2$, the magnitude of the RCF is determined by the radius (r) and the angular velocity ($\omega$). The centrifuge is used in various fields such as the food, pharmaceutical, and mining industries.

Most centrifuges utilize a motor to generate centrifugal force, which increases cost, bulk and complexity. The extra bulk means that the centrifuge is not suitable to carry.

SUMMARY OF THE INVENTION

The present invention provides a handheld centrifuge that is capable of generating centrifugal force without a motor and is easy to carry.

According to an aspect of the present invention, there is provided a handheld centrifuge including: an inertia body having an axle to which one end of a string is connected, and a pair of inertia wheels coupled to the axle; and at least one closed vessel installed in the inertia body to contain a substance to be centrifuged.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described with reference to the accompanying drawings, in which exemplary embodiments of the present invention are shown. Like reference numerals denote like elements throughout the drawings.

Figure 1:
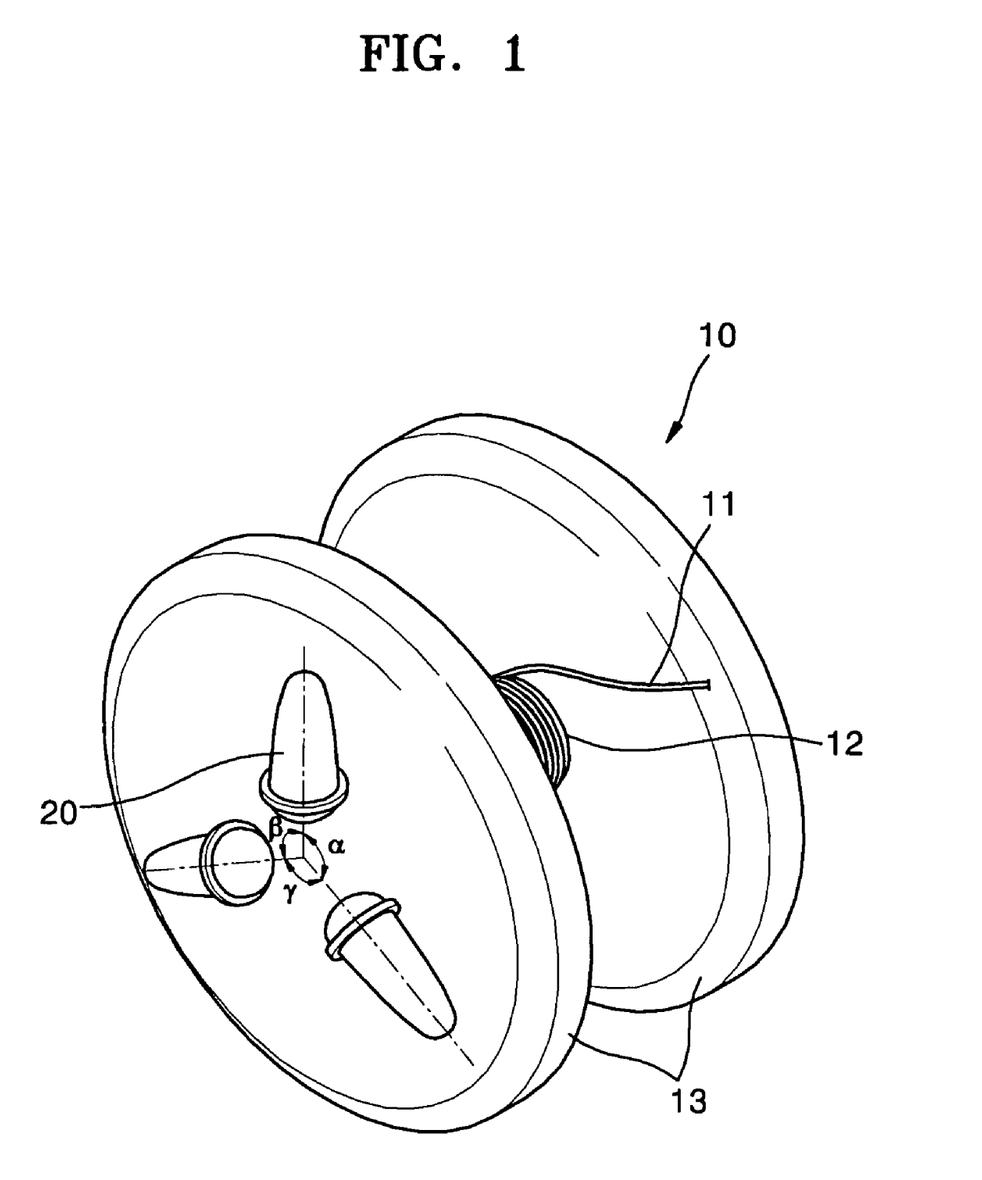
FIG. 1 is a perspective view of a handheld centrifuge according to a first embodiment of the present invention.

FIG. 1 is a perspective view of a handheld centrifuge according to a first embodiemnt of the present invention.

Referring to FIG. 1, a handlield centrifuge 10 includes an inertia body. The inertia body includes an axle 12 to which one end of a string 11 is coupled, and a pair of inertia wheels 13 coupled to the axle 12. The inertia wheels 13 are substantially perendicular to the axle 12 and spaced apart from each other.

Also, the handheld centrifuge 10 includes closed vessels 20 mounted on the outside surface of the inertia wheel 13 in substantially radial direction thereof. Substances such as blood or cellular tissue may be contained in the closed vessels 20 for centrifugation. Structural features of the closed vessel 20 will be described later with reference to FIG. 2.

When a user operates the handheld centrifuge 10 holding one end of the string 11 wound around the axle 12, the inertia wheels 13 of the inertia body are accelerated to a high rotational speed as the string 11 unwinds. If the other end of the string 11 is fixed to the axle 12, the string 11 can be rewound around the axle 12 of the inertia body after it is completely unwound, allowing consecutive rotations of the inertia wheels 13 as the string 11 is unwound and rewound. If the end of the string 11 is not fixed to the axle 12, the inertia wheels 13 may continue rotating for a moment after the string 11 is completely unwound. While the inertia wheels 13 is rotating, if the user applies an impulsive force at one end of the string 11, the string 11 can be rewound around the axle 12 allowing consecutive rotations of the inertia body as the string 11 is unwound and rewound.

As the inertia wheels 13 rotate, the closed vessels 20 mounted on the inertia wheels 13 also rotate. Therefore, a centrifugal force is applied to the substances in the closed vessels 20, to centrifuge them. The sedimentation velocity of the substance by the centrifugal force can be estimated by the following equation 1.

$$U_{sed} = \frac{2 \times r1^2 \times r2 \times \omega^2 \times (\rho1 - \rho2)}{9\mu} \qquad \text{[Equation 1]}$$

where $U_{sed}$ is the sedimentation velocity, r1 is the size (radius) of the substance, r2 is the radius of gyration of the closed vessel 20 measured from the center of the axle 12, $\omega$ is the angular velocity of the inertia wheel 13, $\rho1$ is the density of the substance, $\rho2$ is the density of the fluid in the closed vessel 20, and $\mu$ is the viscosity of the fluid.

Since the sedimentation velocity of the substance is proportional to the square of the angular velocity of the inertia wheel 13, increasing the angular velocity of the inertia wheel 13 enables more rapid centrifugation of the substance.

The closed vessels 20 may be arranged at equal angles ($\alpha=\beta=\gamma$) to allow smooth rotation of the inertia body. Also, this arrangement allows efficient use of the space on the outer surface of the inertia wheels 13. Since the ingredients of the substances must be extracted from the closed vessels 20 after centrifugation, the closed vessels 20 may be detachable from the inertia wheels 13.

Figure 2:
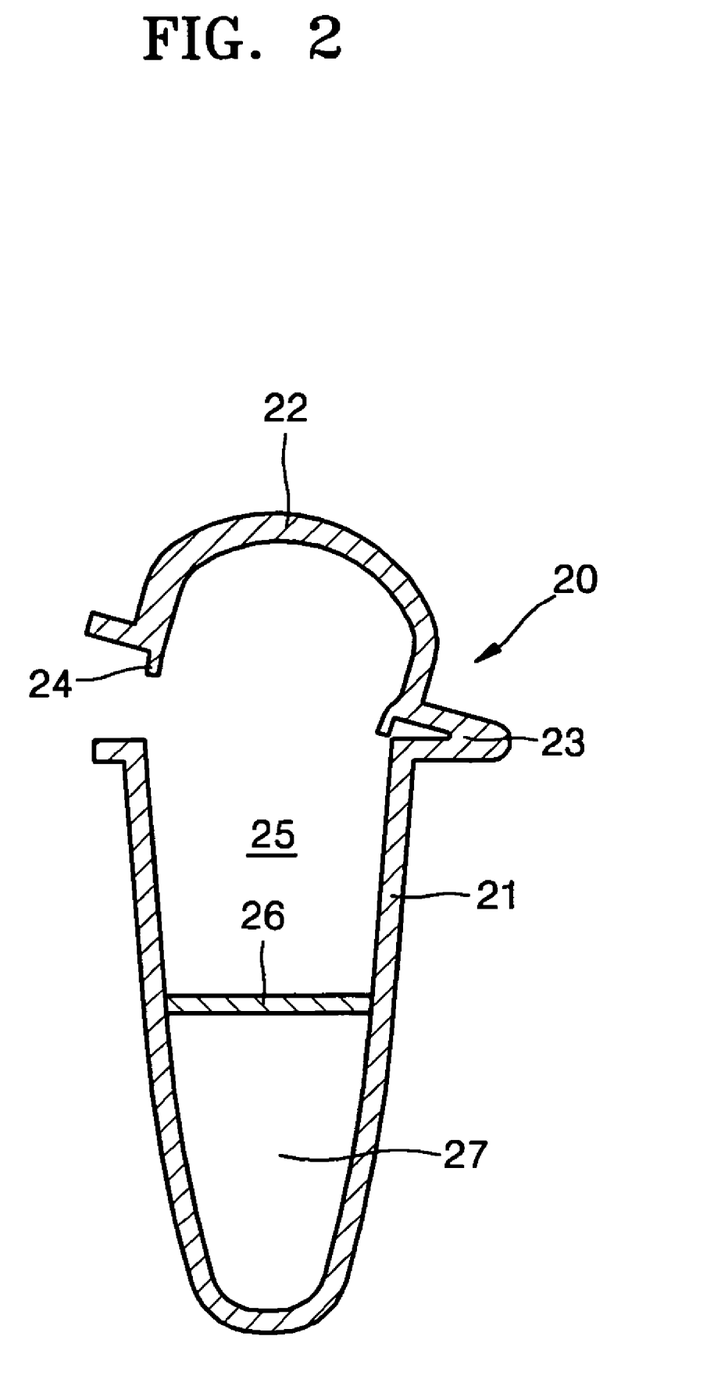
FIG. 2 is a cross-sectional view of a closed vessel installed in a handheld centrifuge according to the present invention.

FIG. 2 is a cross-sectional view of a closed vessel installed in a handheld centrifuge according to the present invention.

Referring to FIG. 2, the closed vessel 20 is mounted on the inertia body to accommodate the substance to be centrifuged. The closed vessel 20 includes a main body 21 and a cap 22 on the main body 21. The main body 21 and the cap 22 are connected through a connecting portion 23. The cap 22 includes a downward protrusion 24 at its bottom. When the protrusion 24 enters the top of the main body 21, an accommodation cavity 25 inside the main body 21 is isolated from the outside.

Also, the closed vessel 20 may include a filter 26. When the centrifuge stops after completing the centrifugation of the substance in the closed vessel 20, centrifugal force is no longer applied to the substance, and the gravity force is applied to the centrifuged substance, which can remix it. That is, if the closed vessel 20 is reversed or inclined when the rotation of the centrifuge 10 is stopped, gravity forces the centrifuged ingredients of the substance in the closed vessel 20 to move, causing the substance to be remixed. Therefore, the filter 26 may be provided to prevent the remixing of the centrifuged ingredients of the substance. The filter 26 defines a plurality of pores through which each ingredient of the substance can penetrate. The sizes of the pores depend on the sizes of the ingredients of the substance. That is, the sizes of the pores are determined such that each ingredient of the substance can pass through the pores under the centrifugal force but not without the centrifugal force. For example, when separating viruses and bacteria from blood, the pores have a diameter of about 1 μm to allow the penetration of the viruses and bacteria but not the red and white blood cells.

In this embodiment, the filter 26 is installed in the closed vessel 20 to prevent the remixing of the centrifuged ingredients of the substance. The present invention, however, is not limited to the filter 26. A gel which has a median specific gravity to the ingredients of the substance and does not mix with the substance can be used as the filter 26. For example, when the concentrations of agaroses are set to 0.1%, 0.5%, and 1% and then the agaroses are hardened, they define pores of different sizes depending on their concentration. Therefore, adjusting the concentration of the agarose according to ingredients of the substance to be centrifuged can facilitate the centrifugation process.

A lysis buffer may be added in a portion 27 under the filter 26 to aid the dissolution of ingredients of the substance to be centrifuged.

Figure 3:
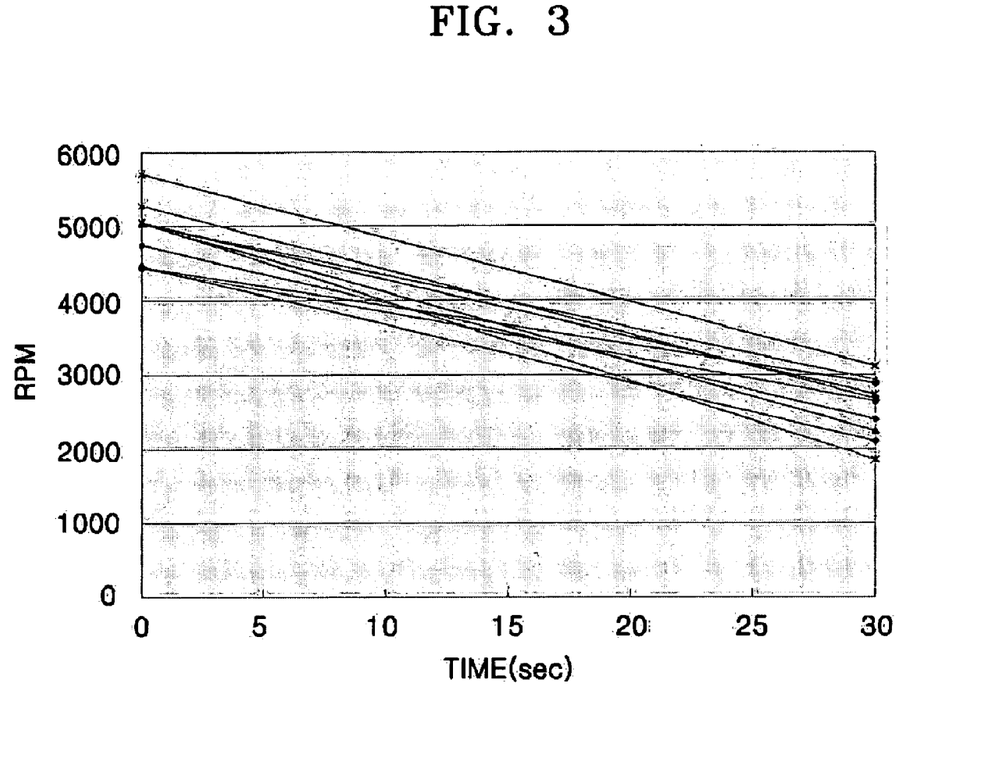
FIG. 3 is a graph showing experimental measurement data of rotational velocity of a handheld centrifuge according to a first embodiment of the present invention.
Figure 4:
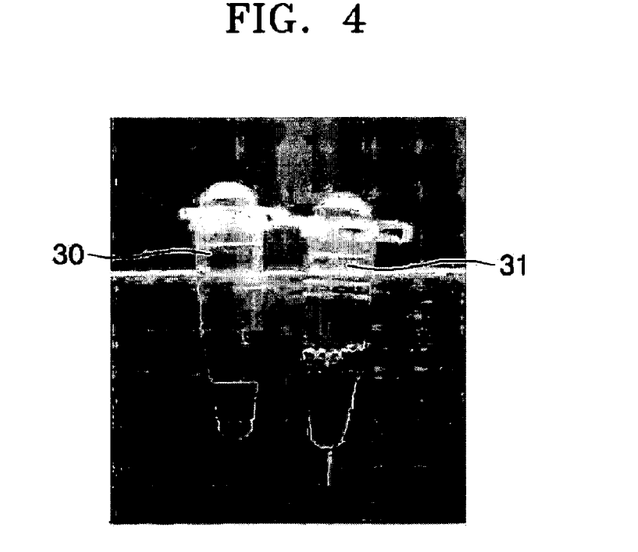
FIG. 4 shows substances in closed vessels after the experiment depicted in FIG. 3.

FIG. 3 is a graph showing experimental measurement data of rotational velocity of a handheld centrifuge according to the first embodiment of the present invention, and FIG. 4 shows substances in closed vessels after the experiment depicted in FIG. 3. The experiment was repeated 5 times with a 1-m long string, a 6-cm diameter inertia wheel, and a 5-mm diameter axle.

Referring to FIG. 3, the rotational velocity of the inertia body decreases with the lapse of the time owing to the friction between the axle 12 and the string 11. The mean rotational velocity of the inertia body changes from 4928 rpm (RCF: about 550 g) right after it is operated (0 sec in the graph) to 2561 rpm (RCF: about 150 g) after 30 seconds.

Referring to FIG. 4, a reference numeral 30 is a closed vessel containing blood that is centrifuged using a conventional centrifuge at 3000 rpm (RCF: about 800 g). A reference numeral 31 is a closed vessel containing blood that is centrifuged using the handheld centrifuge 10 according to the first embodiment of the present invention at the rotational velocity shown in FIG. 3 according to the first embodiment of the present invention. The experiment shows that the handheld centrifuge 10 of the present invention can reliably centrifuge substances.

Figure 5:
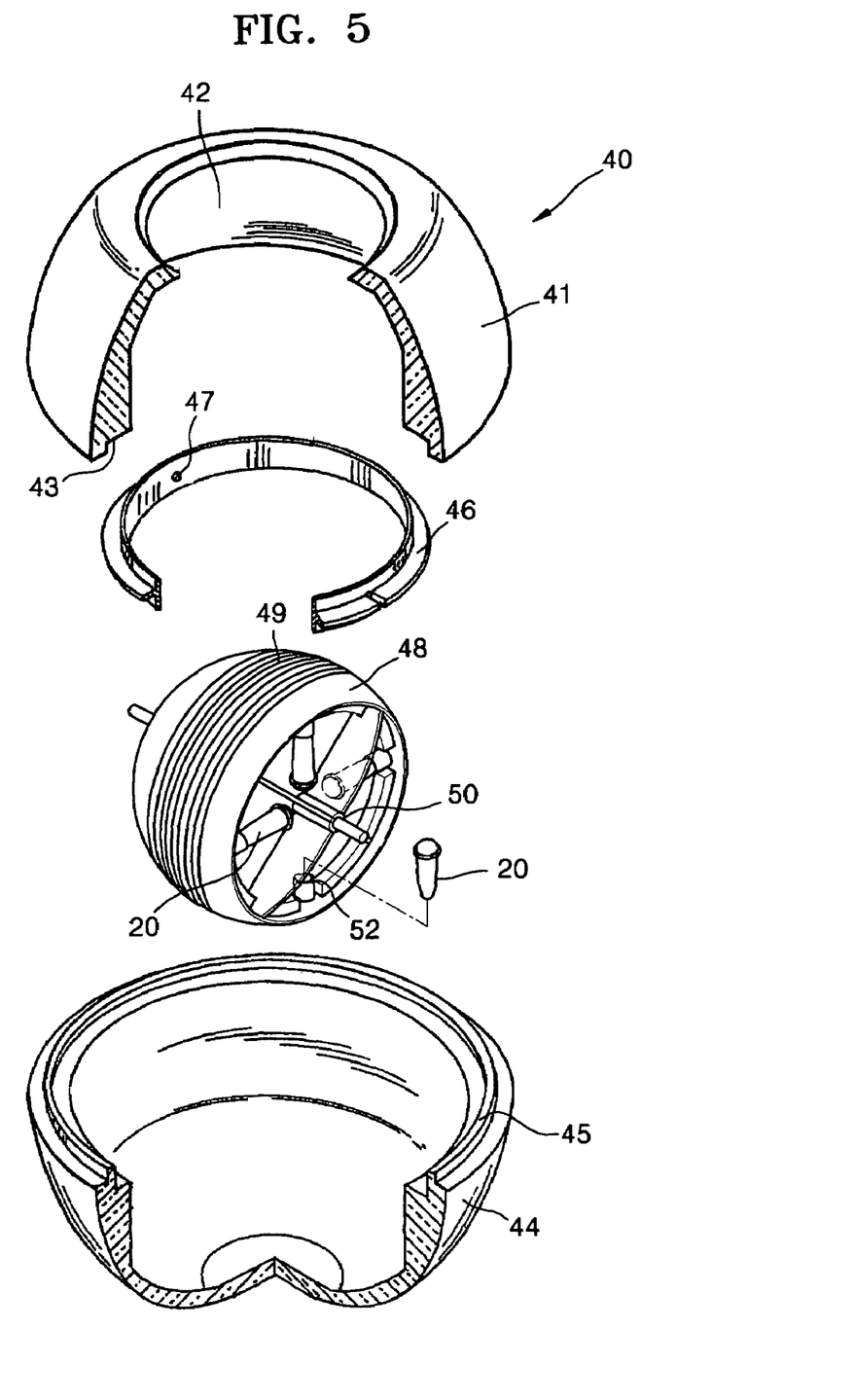
FIG. 5 is an exploded perspective view of a handheld centrifuge according to a second embodiment of the present invention.

FIG. 5 is an exploded perspective view of a handheld centrifuge according to a second embodiment of the present invention.

Referring to FIG. 5, a handheld centrifuge 40 utilizes the gyroscopic effect. The handheld centrifuge 40 includes an upper case 41 defining a hole 42 at its top, and a lower case 44. The upper case 41 has a groove 43 at its bottom, and the lower case 44 has a ridge 45 at its top, such that the upper and lower cases 41 and 44 can be coupled with each other. Also the handheld centrifuge 40 includes a ring 46 and a gyroscopic rotor 48. When assembled, the ring 46 is rotatably inserted between the groove 43 and the ridge 45, and the rotor 48 is rotatably coupled to the ring 46. The rotor 48 includes an axle 50 at its center, and ribs 49 on its outer surface. When assembled, the axle 50 is rotatably inserted in holes 47 of the ring 46, and a string is wound around the ribs 49. Pulling the string rotates the rotor 48.

Also, the rotor 48 includes at least one tube 52 in which the closed vessel 20 can be inserted. The tube 52 may be inclined at a predetermined angle to the axle 50 to effectively apply the centrifugal force to the substance in the closed vessel 20. The closed vessels 20 may be arranged around the axle 50 at equal angles to allow smooth rotation of the rotor 48. The closed vessel 20 may be detachable from the tube 52 to allow easy removal of the centrifuged substance from the closed vessel 20.

When a user applies force to the rotor 48 with the string wound several times around the ribs 49, the rotor 48 starts to rotate. By pulling the string strongly the user can apply a strong rotational force to the rotor 48, increasing the initial angular velocity of the rotor 48.

After rotating the rotor 48 using the string, the user holds the handheld centrifuge 40 with one hand and rotates it by a wrist action, creating torque to rotate the ring 46 and rotor 48 with each rotational axis perpendicular to each other. This torque increases the angular velocity of the rotor 48. When the angular velocity of the rotor 48 exceeds a certain level after repeating this action, the substance in the closed vessel 20 is centrifuged.

Figure 6:
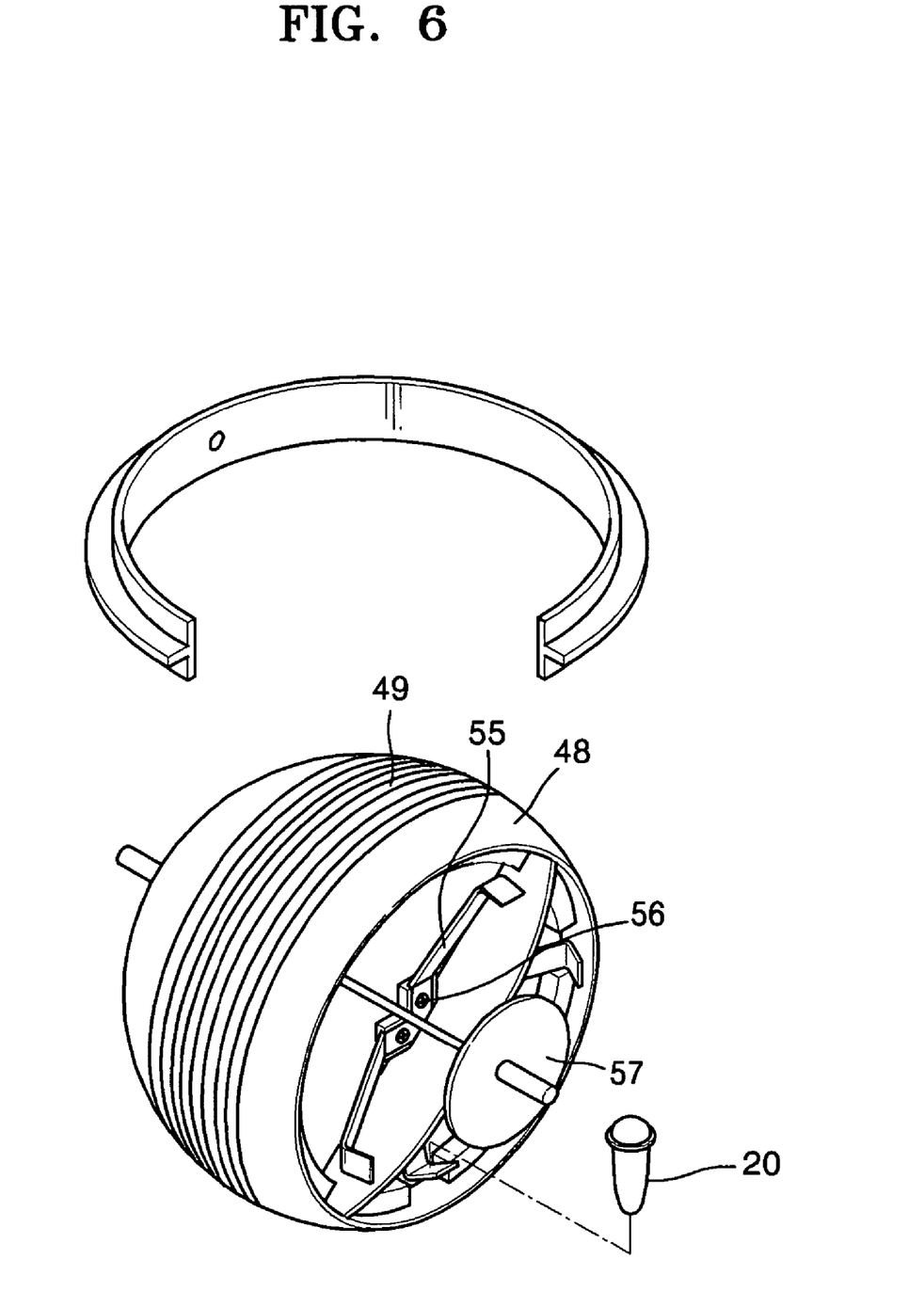
FIG. 6 shows another example of a closed vessel installation in a handheld centrifuge according to a second embodiment of the present invention.

FIG. 6 shows another example of a closed vessel installation in a handheld centrifuge according to a second embodiment of the present invention.

Referring to FIG. 6, the rotor 48 of the handheld centrifuge 40 includes at least one leaf spring 55 and a fixing part 57. The spring 55 is provided to accommodate the closed vessel 20, and it may be fixed to the rotor 48 using additional fasteners such as screws 56.

When the closed vessel 20 is installed to the rotor 48, the lower portion of the closed vessel 20 is seated on the leaf spring 55, and the upper portion of the closed vessel 20 is supported by the fixing part 57. In detail, a user pushes the closed vessel 20 toward the leaf spring 55, which bends to form a sufficient gap between the leaf spring 55 and the fixing part 57. The elastic restoring energy is accumulated in the leaf spring 55. After inserting the upper portion of the closed vessel 20 into the gap, the user releases the closed vessel 20 to allow the leaf spring 55 to press the closed vessel 20 toward the fixing part 57 releasing the accumulated elastic energy. In this way, the closed vessel 20 can be securely installed in the rotor 48.

Figure 7:
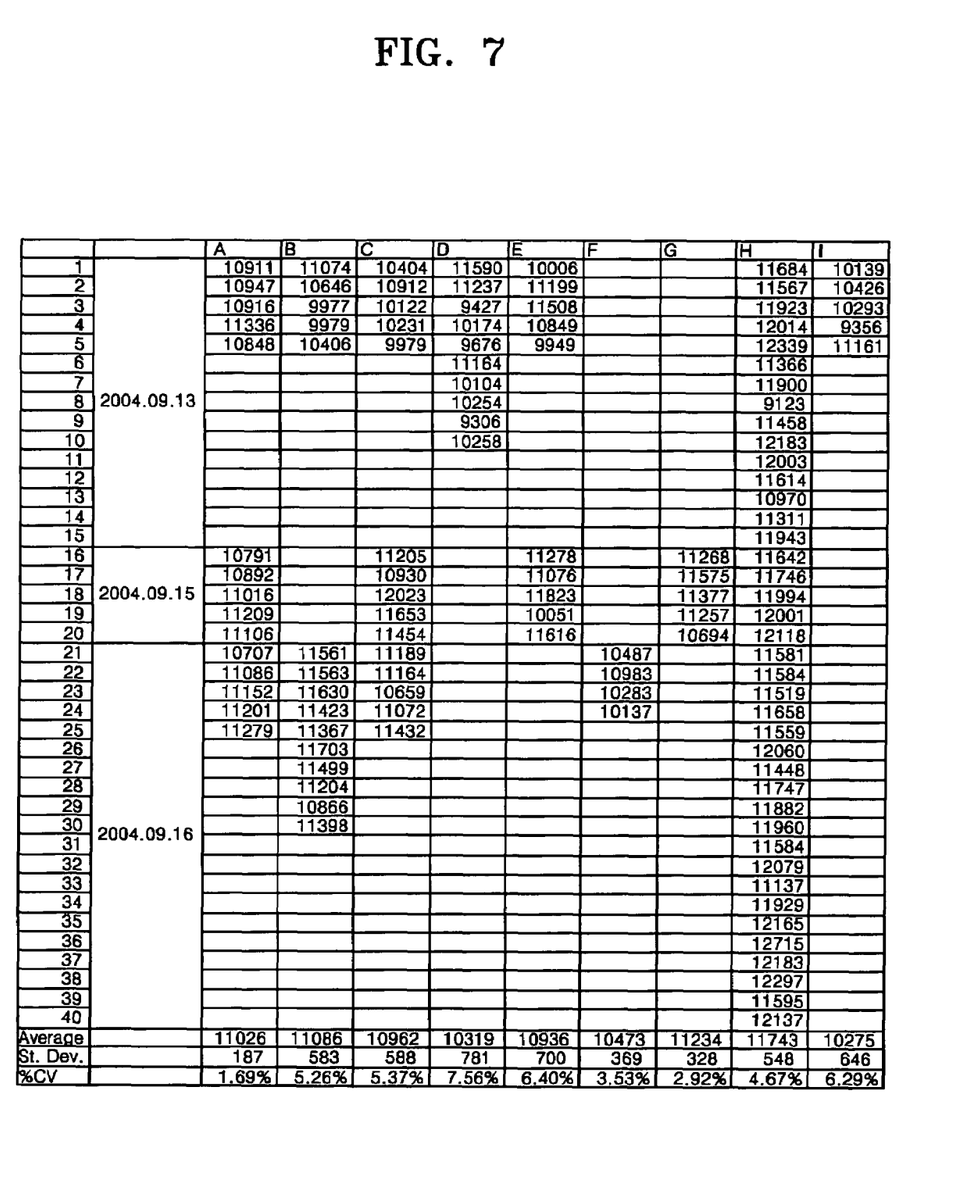
FIG. 7 is a table showing experimental measurement data of rotational velocity of a handheld centrifuge according to a second embodiment of the present invention.

FIG. 7 is a table showing experimental measurement data of rotational velocity of a handheld centrifuge according to a second embodiment of the present invention.

Referring to FIG. 7, letters A to I in the first row denote nine participants in the experiment, and the values in the columns denote rotational velocity of the handheld centrifuge in rpm. The average rotational velocity for all participants was 11158 rpm (about 2090 g). This result shows that the handheld centrifuge according to the second embodiment revolves faster than that of the first embodiment. Therefore, the substance in the closed vessel 20 can be more effectively centrifuged according to the second embodiment.

Figure 8:
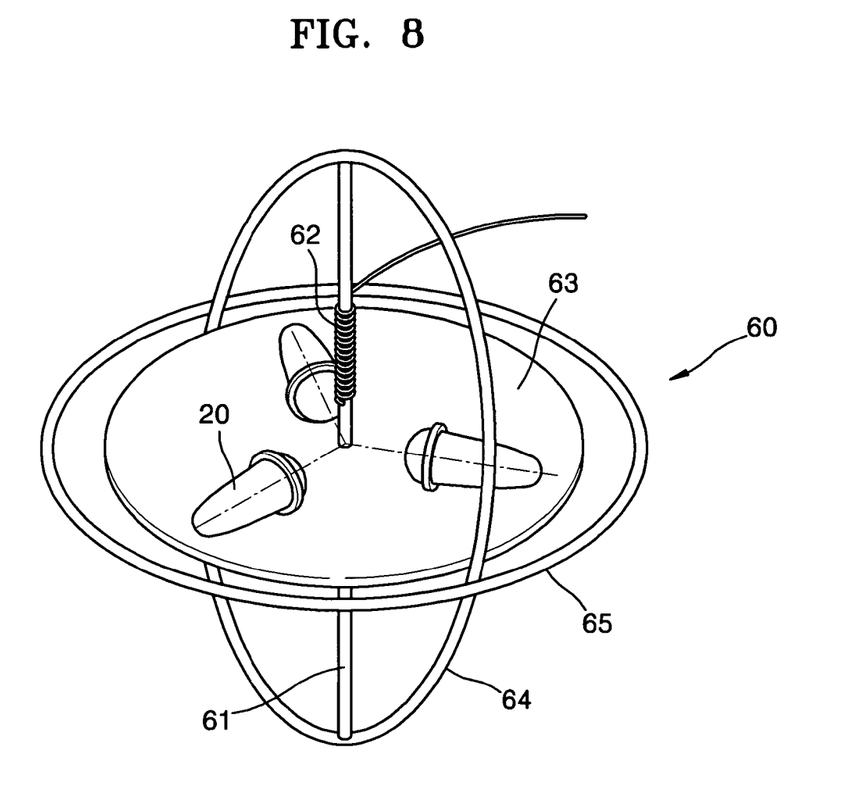
FIG. 8 is a perspective view of a handheld centrifuge according to a third embodiment of the present invention.

FIG. 8 is a perspective view of a handheld centrifuge according to a third embodiment of the present invention.

Referring to FIG. 8, a handheld centrifuge 60 utilizes the principle of the gyroscope top. The handheld centrifuge 60 includes a gyroscope top and at least one closed vessel 20 installed in the gyroscope top to contain the substance to be centrifuged. The gyroscope top includes an axle 61, a disk 63 around the axle 61, and an axle-supporting ring 64 on which the axle 61 is supported.

Also, the gyroscope top may include an overall supporting ring 65 coupled with the axle-supporting ring 64 in the same plane with the disk. The overall supporting ring 65 provides protection for the rotation of the disk 63 against external interference, and more convenience for users.

In operation, a user winds a string 62 around the axle 61 and pulls the string 62, and the frictional force between the string 62 and the axle 61 rotates the axle 61 at a high speed. Accordingly, the disk 63 formed around the axle 61 rotates together with the axle 61. The handheld centrifuge 60 can rotate at a high speed while maintaining a constant orientation of the axle 61 according to the principle of the gyroscope top. Therefore, a substance in the closed vessel 20 mounted on the disk 63 can be easily centrifuged. Also, the handheld centrifuge 60 of this embodiment is small and simple, which increases portability. The closed vessels 20 may be arranged at equal angles.

Figure 9:
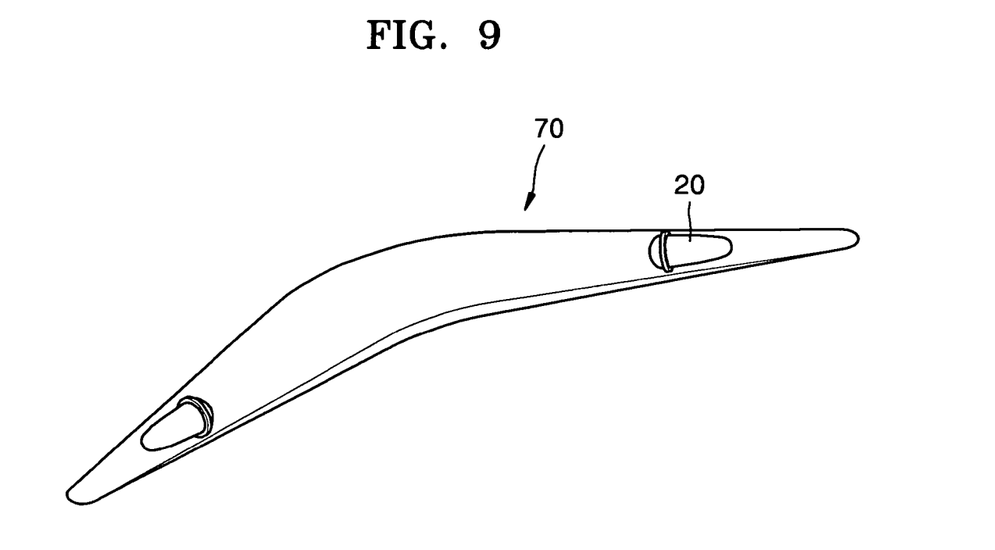
FIG. 9 is a perspective view of a handheld centrifuge according to a fourth embodiment of the present invention.

FIG. 9 is a perspective view of a handheld centrifuge according to a fourth embodiment of the present invention.

Referring to FIG. 9, a handheld centrifuge 70 utilizes the principle of the boomerang. The handheld centrifuge 70 includes a flat boomerang and at least one closed vessel 20 installed in the boomerang to contain the substance to be centrifuged. In operation, a user throws the handheld centrifuge 70 in the air to rotate it. Centrifugal force generated by the rotation of the handheld centrifuge 70 is applied to the substance in the closed vessel 20 to centrifuge the substance. Closed vessels 20 may be preferably installed at both ends of the boomerang to apply stronger centrifugal force to the substance in the closed vessels 20 when the handheld centrifuge 70 is rotated.

Meanwhile, the handheld centrifuge 10/40/60/70 of the present invention may include an additional separation agent in the closed vessel 20 to separate a specific ingredient from a substance. For example, when it is intended to separate white blood cells from blood, the centrifugation operation can be carried out after adding a separation agent to the closed vessel 20, to easily separate the white blood cells. After the centrifugation operation with the separation agent, the blood in the closed vessel 20 is separated into a red blood cell layer, a white blood cell layer, and a blood serum layer, from the bottom of the closed vessel 20. The white blood cells can be easily separated from the blood. Also, the filter 26 installed in the closed vessel 20 prevents the separated ingredients of the blood from remixing.

As described above, since the handheld centrifuge of the present invention is easy to carry, it can be used without limitation of time and location.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A handheld centrifuge comprising:
   an inertia body having an axle to which one end of a string is connected, and a pair of inertia wheels coupled to the axle, the inertia wheels being substantially perpendicular to the axle; and
   at least one closed vessel installed on an outer face of the inertia wheel to contain a substance to be centrifuged, the closed vessel being installed in substantially radial direction of the inertia wheel.

2. The handheld centrifuge of claim 1, wherein the closed vessel includes a filter to keep the centrifuged state of the substance in the closed vessel.

3. The handheld centrifuge of claim 2, wherein the filter is made of gel.

4. The handheld centrifuge of claim 1, wherein the closed vessel is detachable.

5. The handheld centrifuge of claim 1, wherein the closed vessel includes two or more closed vessels arranged at equal angles.

6. The handheld centrifuge of claim 1, wherein the closed vessel includes a lysis buffer.

7. The handheld centrifuge of claim 1, wherein the closed vessel includes a separation agent to separate a desired ingredient from the substance.

\* \* \* \* \*